United States Patent [19]

Bernard et al.

[11] Patent Number: 5,411,638
[45] Date of Patent: May 2, 1995

[54] TREATMENT BY PLASMA OF AN ARAMID MONOFILAMENT AND MONOFILAMENT THUS OBTAINED

[75] Inventors: Denis Bernard, Saint-Laure, France; Jean-Luc Cornillon, Greer, S.C.

[73] Assignee: Compagnie Generale Des Establissements Michelin-Michelin & Cie, Clermont-Ferrand Cedex, France

[21] Appl. No.: 78,288

[22] PCT Filed: Dec. 20, 1991

[86] PCT No.: PCT/FR91/01052

§ 371 Date: Jun. 22, 1993

§ 102(e) Date: Jun. 22, 1993

[87] PCT Pub. No.: WO92/12285

PCT Pub. Date: Jul. 23, 1992

[30] Foreign Application Priority Data

Dec. 27, 1990 [FR] France .................. 90 16597

[51] Int. Cl.$^6$ ................................ H05F 3/00
[52] U.S. Cl. .................... 204/164; 428/364; 428/375; 428/359; 428/395; 428/371; 428/373; 427/434.6; 427/538; 427/539; 525/331.9; 528/480; 528/483; 564/463; 57/902
[58] Field of Search .............. 204/164; 525/331.9; 528/480, 483; 564/463; 428/373, 371, 364, 375, 395, 359; 57/902; 427/536, 538, 539, 434.2, 434.6

[56] References Cited

U.S. PATENT DOCUMENTS

| 4,328,324 | 4/1982 | Kock et al. | 525/423 |
| 4,469,748 | 4/1984 | Sharma | 428/378 |
| 5,246,776 | 9/1993 | Meraldi et al. | 428/364 |

FOREIGN PATENT DOCUMENTS

| 0006275 | 6/1979 | European Pat. Off. |
| 0168131 | 1/1986 | European Pat. Off. |
| 0172057 | 2/1986 | European Pat. Off. |

OTHER PUBLICATIONS

Testing of Textiles, German Standard, DIN 53834, DK 677.06 1/.062: 620/172, Feb. 76 pp. 1–24.
Materials Testing Machines, DIN 51220, UDC 620.1.05 pp. 1–2, Jul. 93.
Tensile Testing Machines, DIN 51221, UDC 620.1.05:620.172, 7–93 pp. Jul. 5.
Compression Testing Machines, DIN 51 223 UDC 620.1.05:620.173; Jul. 94 pp. 1–5.
European Standard, Standard Atmospheres for Conditioning and Testing, EN 20139, Aug. 1992, DIN 53-302, pp. 1–3.
Determination of Count Yarns and Plied Yarns, UDC 677.072.3/.6.620.1/677.017.272, May 1981, DIN 53 830, pp. 1–18.

*Primary Examiner*—Kathryn Gorgos
*Attorney, Agent, or Firm*—Brumbaugh, Graves, Donohue & Raymond

[57] ABSTRACT

A method of treating an aramid monofilament by plasma in such a manner that the monofilament has a wettability by water satisfying the relationship $WS_{SL} \geq 120$, $W_{SL}$ being the reversible solid-liquid adhesion work expressed in $mJ/m^2$. By way of example, the treatment is carried out by means of a plasma at reduced pressure, and the monofilament is subjected to a coating treatment after the surface treatment. The aramid monofilament is characterized by the following relationships:

$1.7 \leq Ti \leq 260$;
$40 \leq D \leq 480$;
$T \geq 170 - D/3$;
$Mi \geq 2,000$; and
$W_{SL} \geq 120$.

In the above relationships, Ti represents linear density in tex, D represents diameter in μm (micrometers), T represents tenacity in cN/tex, and Mi represents initial modulus in cN/tex. The aramid monofilament is particularly useful for reinforcing tires.

23 Claims, No Drawings

TREATMENT BY PLASMA OF AN ARAMID MONOFILAMENT AND MONOFILAMENT THUS OBTAINED

CROSS-REFERENCE TO RELATED APPLICATIONS

U.S. Pat. No. 5,246,776 is hereby incorporated by reference in the present application.

BACKGROUND OF THE INVENTION

The present invention relates to fibers of aromatic polyamides such that at least 85% of the amide linkages (—CO—NH—) are joined directly to two aromatic rings, these fibers being currently known as "aramids".

More particularly, the invention relates to the bonding of these aramid fibers to rubber compositions. U.S. Pat. No. 5,246,776, which is incorporated by reference in the present application, describes aramid monofilaments having both a large diameter and high mechanical characteristics in the as-spun condition.

These monofilaments are characterized by the following relationships:

$1.7 \leq Ti \leq 260$;
$40 \leq D \leq 480$;
$T \geq 170 - D/3$;
$Mi \geq 2000$;

Ti being the linear density in tex, D being the diameter in μm (micrometers), T being the tenacity in cN/tex, and Mi being the initial modulus in cN/tex.

SUMMARY OF THE INVENTION

The object of the invention is to propose a treatment which makes it possible to obtain good adhesion of these monofilaments to rubber compositions.

Accordingly, the method of the invention for treating at least one aramid fiber so as to promote its adhesion to rubber is characterized by the following points:

(a) at least one monofilament is used which satisfies the following relationships:

$1.7 \leq Ti \leq 260$;
$40 \leq D \leq 480$;
$T \geq 170 - D/3$;
$Mi \geq 2000$;

Ti being the linear density in tex, D being the diameter in μm (micrometers), T being the tenacity in cN/tex, and Mi being the initial modulus in cN/tex;

(b) this monofilament is subjected to a surface treatment by plasma in such a manner that the monofilament has a wettability by water which satisfies the relationship $W_{SL} \geq 120$, $W_{SL}$ being the reversible solid-liquid adhesion work expressed in $mJ/m^2$.

The monofilament treated in this manner is preferably then subjected to an adhering treatment employing two successive coating baths before being contacted with a rubber composition.

The invention also relates to an aramid monofilament characterized by the following relationships:

$1.7 \leq Ti \leq 260$;
$40 \leq D \leq 480$;
$T \geq 170 - D/3$;
$Mi \geq 2000$;
$W_{SL} \geq 120$;

Ti being the linear density in tex, D being the diameter in μm (micrometers), T being the tenacity in cN/tex, and Mi being the initial modulus in cN/tex; $W_{SL}$ being the reversible solid-liquid adhesion work expressed in $mJ/m^2$.

The monofilament of the invention can be used, either by itself or in the form of assemblages, for instance to reinforce articles, in particular articles of plastic and/or rubber, such articles being for instance belts, hoses, or automobile tires, the invention also covering these assemblages and articles reinforced in this manner.

DESCRIPTION OF THE PREFERRED EMBODIMENTS

The invention will be easily understood on the basis of the following examples:

I. DETERMINATION OF THE CHARACTERISTICS

1. Conditioning

By conditioning there is understood in the present specification the treatment of the monofilaments and assemblages in accordance with Federal German Standard DIN 53 802-20/65 of July 1979.

2. Linear Density

The linear density of the monofilaments and assemblages is determined in accordance with Federal German Standard DIN 53 830 of June 1965, the products having previously undergone conditioning.

The measurement is effected by weighing out at least three samples, each corresponding to a length of 50 m in the case of a monofilament or to a length of 5 m in the case of an assemblage. The linear density is expressed in tex. It is indicated as Ti for the monofilaments.

3. Diameter

The diameter of the monofilaments is determined by calculation from the linear density of the monofilaments and their density, in accordance with the formula:

$$D = 2 \times 10^{1.5} (Ti/\pi\rho)^{\frac{1}{2}}$$

D representing the diameter of the monofilaments in μm, Ti representing the linear density in tex, and ρ representing the density in $g/cm^3$.

The diameter of the assemblages is measured in accordance with the following method. The assemblage is under tension, this tension being between 0.9 times and 1.1 times the standard pretension, which is 0.5 cN/tex. The assemblage intersects a parallel beam of light. The shadow cast on a bar of photoreceptive diodes is measured instantaneously. The result of a measurement is the average width of the shadow, determined at 900 points on 50 cm of assemblage. The diameter of the assemblage is calculated by forming the average of four measurements and it is expressed in μm.

4. Dynamometric Properties

The dynamometric properties of the monofilaments and assemblages are measured by means of a traction machine of Zwick GmbH & Co. (Federal Republic of Germany) of type 1435 or 1445, corresponding to Federal German Standards DIN 51 220 of October 1976, DIN 51 221 of August 1976 and DIN 51 223 of December 1977, in accordance with the procedure described in Federal German Standard DIN 53 834 of February 1976. The monofilaments and assemblages are subjected to traction over an initial length of 400 mm.

The following properties are thus determined: tenacity, initial modulus, secant modulus, and elongation upon rupture. The tenacity and the modulus of extension are expressed in cN/tex (centinewton per tex). The elongation upon rupture is expressed in %.

The tenacity is indicated as T in the case of the monofilaments.

The initial modulus Mi is defined as the slope of the linear portion of the stress-strain curve which is present just after the standard pretension of 0.5 cN/tex. This modulus Mi is measured for the monofilaments.

The secant modulus $M_a$ is calculated for the assemblages in accordance with the relationship:

$$M_a = 400 \times \frac{F_1 - F_2}{(Ti)_a}$$

with
- $F_1$: force to which the assemblage is subjected for an elongation of 0.35%;
- $F_2$: force to which the assemblage is subjected for an elongation of 0.10%;
- $(Ti)_a$: linear density of the assemblage.

The elongation upon rupture is referenced as Ar for the monofilaments.

All the dynamometric properties are determined by taking the average of ten measurements.

5. Density

The densities $\rho$ of the monofilaments are measured by using the density gradient tube technique for plastics specified in ASTM Standard D1505-68 (reapproved in 1975), method C, using a mixture of 1,1,2-trichlorotrifluoroethane and 1,1,1-trichloroethane as liquid system for the density gradient tube.

The samples used are short lengths of about 2 cm of loosely knotted monofilaments. Before measurement, they are immersed for two hours in the component of the liquid system which has the lowest density. They then remain in said tube for 12 hours before being evaluated. It is seen to it in particular that the retention of bubbles of air on the surface of the monofilaments is avoided.

The density in $g/cm^3$ is determined on two samples per monofilament and the average value is reported with four significant digits.

6. Inherent Viscosity

The inherent viscosity (I.V.) of the polymer is expressed in deciliters per gram and defined by the following equation:

$$I.V. = (1/C)Ln(t1/to)$$

in which

C is the concentration of the polymer solution (0.5 g of polymer in 100 $cm^3$ of solvent). The solvent is 96% concentrated sulfuric acid.

Ln is the natural logarithm.

t1 and to represent the flow time of the solution of polymer and of pure solvent respectively at 30°±0.1° C. in a Ubbelohde capillary viscosimeter.

7. Optical Properties

The optical anisotropy of the spinning compositions, in molten state at rest, is observed by means of an Olympus BH2 polarization microscope equipped with a hot stage.

8. Wettability

The principle of the measurement consists in determining the variation in force which a sample of monofilament extracted from an assemblage under study undergoes upon its immersion in water. The variation in weight $\Delta M$ measured upon the immersion in the liquid can be written:

$$\Delta M = \frac{\gamma_{LV} \times P \times \cos\theta}{g}$$

$\gamma_{LV}$ being the surface energy of the water, P being the perimeter of the sample, g being the acceleration of gravity, $\theta$ being the liquid/solid contact angle. The perimeter P is measured in known manner by immersing the sample in a solution which fully wets the sample, $\cos\theta$ being then equal to 1.

The principle of the measurement is as follows. The sample is suspended vertically on an electric balance. A receptacle filled with water is brought up to this sample and the variation in weight $\Delta M$ is measured as a function of the depth of immersion starting upon contact of the water with the sample, while raising the receptacle. A curve is thus obtained and the value of $\Delta M$ at a depth of immersion of zero is extrapolated.

The reversible solid/liquid adhesion energy is given by the equation:

$$W_{SL} = \gamma_{LV} \times (1 + \cos\theta)$$

This energy is representative of the polarity of the surface of the fibers.

9. Adhesion Measurements

The assemblages are inserted between two layers of rubber mixes in such a manner that the assemblages are disposed in a plane, forming U-shaped loops, the branches (ends) of which are parallel, the curved portion of the U being disposed on the outside of the layers of rubber.

The rubber mixes have the following composition (parts by weight):

| | |
|---|---|
| Natural rubber | 50 |
| SBR | 30 |
| PBR | 20 |
| Carbon black | 50 |
| ZnO | 5 |
| Stearic acid | 1 |
| Antioxidant | 1 |
| Sulfur | 2 |
| Accelerator | 1 |

SBR: styrene-butadiene copolymer rubber;
PBR: polybutadiene rubber;
Antioxidant: Santoflex ®13, which is an antioxidant consisting of N-(1-3-dimethylbutyl)-N'-phenyl-p-phenylenediamine of the Monsanto Company;
Accelerator: Sulfenamide type.

The test specimens thus obtained are placed in a mold and vulcanized at 160° C. for 15 minutes under a pressure of 15 $daN/cm^2$.

The adhesion is characterized by measurement of the force necessary to tear the loops from the rubber composition, the tearing measurement being effected at 20° C. with a rate of traction of 100 mm/min. This force is determined for each loop, and the average force per end is calculated at the end of the operation, based on an average of 12 measurements.

II. PRODUCTION OF THE MONOFILAMENTS

The aramid monofilaments are prepared in accordance with the method claimed in the aforementioned PCT/CH90/00155. The essential points of this preparation are as follows:

(a) A solution is used of at least one aromatic polyamide such that at least 85% of the amide linkages (—CO—NH—) are joined directly to two aromatic rings, the inherent viscosity of this polyamide or these polyamides being at least equal to 4.5 dl/g, the concentration of polyamide(s) in the solution being at least 20% by weight, this spinning composition being optically anisotropic in the molten state and at rest.

(b) This solution is extruded in a spinneret through a capillary the diameter of which is greater than 80 μm, the spinning temperature, that is to say the temperature of the solution upon its passage through the capillary being equal to at most 105° C.;

(c) The jet of liquid emerging from the capillary is drawn in a noncoagulating layer of fluid;

(d) The drawn liquid vein thus obtained is then introduced into a coagulating medium; monofilament which is thus in course of formation remains in dynamic contact with the coagulation medium for the time "t", the temperature of the coagulating medium being equal to at most 16° C.;

(e) The monofilament is washed and dried; the diameter D of the dry monofilament which has thus been completed and the time t are related to each other by the following equations:

$$t = KD^2; K > 30$$

t being expressed in seconds and D being expressed in millimeters.

Each of the monofilaments prepared by this method satisfies the following relationships:

$1.7 \leq Ti \leq 260$;
$40 \leq D \leq 480$;
$T \geq 170 - D/3$;
$Mi \geq 2000$;

Ti being the linear density in tex, D being the diameter in μm (micrometers), T being the tenacity in cN/tex, and Mi being the initial modulus in cN/tex for this monofilament.

Various additives or substances, such as, for instance, plasticizers, lubricants, and products for improving the adhesivity of the product to a rubber matrix, may possibly be incorporated in the polymer or in the spinning solution or applied to the surface of the monofilament, during the different stages of the process previously described.

III. TREATMENTS CARRIED OUT

1. Plasma Treatment

The treatment apparatus is formed of a drum arranged in a cylindrical enclosure in which a vacuum can be produced. Within the enclosure, the drum is surrounded by two cylindrical grids serving as electrodes. For each plasma treatment, the assemblage is wound around the drum in a single layer and a varying voltage of high frequency is applied between the electrodes so as to produce a plasma with a gas under slight pressure contained within the enclosure.

2. Coating Treatments

The assemblages, whether or not treated with a plasma, are subjected to one of the following coating treatments:

First Treatment

The assemblages pass into a first bath, the composition of which is as follows (parts by weight)

| | |
|---|---|
| Epoxy resin (1) | 5.0 |
| Aerosol (2) | 0.3 |
| Caustic soda (NaOH) | 0.3 |
| Water | 994.4 |

(1) DENACOL EX 512, an epoxy resin consisting of polyglycerol polyglycidylether resin of the NAGASE Company;
(2) OT aerosol of American Cyanamid.

The assemblages then undergo a heat treatment between 210° and 260° C., for example 250° C., for a period of time of between 20 and 120 seconds, for example 30 seconds.

They are then passed into a second bath, the composition of which is as follows (parts by weight):

| | |
|---|---|
| Latex VP 41% (1) | 319 |
| Ammonia | 25 |
| Sizing resin | 149 |
| Water | 507 |

(1) Butadiene/styrene/vinylpyridine 70/15/15 terpolymer latex of a concentration of 41% in water.

(1) Butadiene/styrene/vinylpyridine 70/15/15 terpolymer latex of a concentration of 41% in water.

The sizing resin itself has the following composition (parts by weight);

| | |
|---|---|
| Resorcinol | 65 |
| Caustic soda 1N | 44 |
| Formaldehyde 31% | 114 |
| Water | 777 |

A heat treatment is then carried out between 210° and 260° C. for instance at 250° C., for a period of between 20 and 120 seconds, for instance 30 seconds.

Second Treatment

The assemblages pass into a first bath having the following composition (parts by weight):

| | |
|---|---|
| Isocyanate (1) | 3 |
| Methylene chloride | 97 |

(1) Desmodur ® R, an isocyanate consisting of triphenylmethane triisocyanate of the Bayer Company.

A heat treatment is then carried out between 100° and 200° C. for instance at 170° C. for a period of time of between 20 and 120 seconds, for instance 70 seconds, whereupon the assemblages are passed into a second bath having the same composition as the second bath of the first treatment, and a heat treatment is carried out between 210° and 260° C. for instance at 250° C., for a period of time of between 20 and 120 seconds, for instance 30 seconds.

IV. THE CARRYING OUT OF THE TESTS

For each test, there is used an assemblage of aramid monofilaments prepared in accordance with section II of the Description of the Preferred Embodiments. The assemblages are cables which have the formula (1+6) 18. that is to say they are formed of seven monofilaments, each filament having a diameter of 0.18 mm (180 micrometers). One filament which is oriented practically in the direction of the axis of the assemblage serves as a core. The six other filaments are wound helically in the form of a layer around the core, the acute angle which each monofilament of said layer makes with the axis of the assemblage being about 6°, the diameter of the assemblage being about 540 μm, and each of the monofilaments being practically without twist on itself.

The cables used are of two types:

Type A: The monofilaments are of poly(paraphenylene terephthalamide) obtained from terephthaloyl dichloride and paraphenylene diamine;

Type B: The monofilaments are of aromatic copolyamide, this copolyamide being obtained from the following monomers: terephthaloyl dichloride, paraphenylene diamine (PPDA), and 1,5-naphthylene diamine (NDA) with 3 mols of NDA to 100 mols of diamines.

The average properties of the monofilaments and the characteristics of the cables are given in Table 1.

TABLE 1

|  | Type A | Type B |
| --- | --- | --- |
| Monofilament |  |  |
| Linear Density (tex) | 36.4 | 36.3 |
| Diameter (μm) | 180 | 180 |
| Tenacity (cN/tex) | 149 | 121 |
| Initial modulus (cN/tex) | 5300 | 4570 |
| Density (g/cm$^3$) | 1.43 | 1.42 |
| Elongation upon rupture (%) | 3.7 | 3.2 |
| Cables |  |  |
| Tenacity (cN/tex) | 140 | 109 |
| Secant modulus (cN/tex) | 4600 | 3820 |
| Elongation upon rupture (%) | 3.9 | 3.4 |

Table 2 below gives the references assigned to the cables as a function of the type of monofilament and the treatment suffered by the cables.

TABLE 2

|  | Type A | Type B |
| --- | --- | --- |
| Tests in accordance with the invention (Plasma Treatment) |  |  |
| First coating treatment | A1 | B1 |
| Second coating treatment | A2 | B2 |
| Tests not in accordance with the invention (No plasma treatment) |  |  |
| First coating treatment | (A1)$_o$ | (B1)$_o$ |
| Second coating treatment | (A2)$_o$ | (B2)$_o$ |

In the tests in accordance with the invention, the cables are subjected to a plasma treatment before the coating treatment, the conditions of the plasma treatment being as follows: plasma gas: oxygen; power of the apparatus: 2500 watts; pressure of the gas: 150 millitorrs (20 Pa); time of contact with the plasma: 30 minutes. In the tests not in accordance with the invention, the cables are subjected directly to the coating treatment, without prior plasma treatment.

The cables thus obtained, whether or not in accord with the invention, are then subjected to the adhesion test described in subsection 9 of section I of the Description of the Preferred Embodiments. The results obtained are given in Table 3. In this Table 3, the tear values are set arbitrarily equal to 100 for the cables which directly underwent the coating treatment without prior plasma treatment, and the tear values for the cables in accordance with the invention (plasma treatment, then coating treatment) are referred to this base of 100 with respect to the corresponding cable, Table 3, therefore, giving relative values.

TABLE 3

| Cable Reference | Tearing Force per End |
| --- | --- |
| In accordance with the invention |  |
| A1 | 128.5 |
| B1 | 136.4 |
| A2 | 144.6 |
| B2 | 138.0 |
| Not in accordance with the invention |  |
| (A1)$_o$ | 100 |
| (B1)$_o$ | 100 |
| (A2)$_o$ | 100 |
| (B2)$_o$ | 100 |

Table 4 furthermore gives the values of $W_{SL}$ for the monofilament of Types A and B before and after plasma treatment.

TABLE 4

| Monofilament | Value of $W_{SL}$ (mJ/m$^2$) |
| --- | --- |
| Before plasma treatment |  |
| A | 99.0 |
| B | 118.1 |
| After plasma treatment |  |
| A | 123.5 |
| B | 135.2 |

The comparison of the tearing forces of Table 3 between the cables in accordance with the invention which underwent the plasma treatment and the cables of the same type which underwent the same coating treatment but without plasma treatment, shows that the invention makes it possible to obtain the following increases in the tearing forces:

28.5% for the A1 cables as compared with the (A1)$_o$ cables 44.6% for the A2 cables as compared with the (A2)$_o$ cables 36.4% for the B1 cables as compared with the (B1)$_o$ cables 38.0% for the B1 cables as compared with the (B2)$_o$ cables This increase is substantial, in particular in the case of cables A2, B2 which underwent the second coating treatment (first bath containing isocyanates).

These increases remain of the same order of magnitude when the gas is changed upon the plasma treatment (use, for instance, of argon, nitrogen, sulfur dioxide SO2), when the power of the plasma device is modified (for instance, between 500 and 5000 watts), when the time of the plasma treatment is modified (for instance, between 10 minutes and 60 minutes) or when the pressure of the plasma gas is modified, for example between 50 and 500 millitorrs. The characteristics of the plasma treatment are therefore not critical.

In the embodiments in accordance with the invention, a plasma treatment at reduced pressure was used, but the invention applies in the event of the use of plasma treatment at atmospheric pressure, also known as corona treatment.

The invention applies, in particular, to aramid monofilaments having the preferred characteristics indicated in the aforesaid application PCT/CH90/00155, in particular the following characteristics:

the elongation upon rupture Ar is greater than 2;

the monofilaments satisfy at least one of the following relationships:

$T \geq 190$-D/3; $Mi \geq 6800$-10D; $Ar \geq 3$;

In these relationships, Ar is expressed in %, T and Mi are expressed in cN/tex, and D is expressed in μm.

Of course, the invention is not limited to the embodiments previously described. Thus, in the examples previously described, the plasma treatments and coating treatments were carried out on assemblages of monofilaments, but the invention applies in the event that at least one of these treatments is carried out on a single monofilament, that is to say one which is not part of an assemblage.

We claim:

1. A method of treating at least one aramid fiber to promote its adhesion to rubber, characterized by the following features:

(a) at least one monofilament is used which satisfies the following relationships:
    $1.7 \leq Ti \leq 260$;
    $40 \leq D \leq 480$;
    $T \geq 170-D/3$;
    $Mi \geq 2000$;
    wherein Ti is the linear density in tex, D is the diameter in μm (micrometers), T is the tenacity in cN/tex, and Mi is the initial modulus in cN/tex;

(b) this monofilament is subjected to a surface treatment by plasma so that the monofilament has a wettability by water which satisfies the relationship $W_{SL} \geq 120$, wherein $W_{SL}$ is the reversible solid-liquid adhesion work expressed in mJ/m².

2. A method according to claim 1, in which the surface treatment is carried out by means of a plasma at reduced pressure.

3. A method according to claim 1, in which the monofilament is furthermore subjected to a coating treatment after the surface treatment.

4. A method of according to claim 3, in which the coating treatment is carried out with two successive baths, and a heat treatment of the monofilament is effected after each bath.

5. A method according to claim 4, in which the first bath has a base of epoxy resin and the second bath has a base of a phenol resin and a latex.

6. A method according to claim 4, in which the first bath has a base of isocyanate and the second bath has a base of a phenol resin and a latex.

7. A coated monofilament obtained by the method according to claim 3.

8. A monofilament obtained by the method according to claim 1.

9. An assemblage comprising at least one monofilament according to claim 8.

10. An article reinforced with at least one assemblage according to claim 9.

11. A method of producing an article in which at least one assemblage according to claim 9 is placed in contact with a rubber composition.

12. A method according to claim 11, in which the rubber composition in then vulcanized.

13. An article obtained by the method according to claim 11, characterized in it is a tire.

14. An article reinforced with at least one monofilament according to claim 8.

15. A method of producing an article, in which at least one monofilament in accordance with claim 8 is placed in contact with a rubber composition.

16. A method according to claim 15, in which the rubber composition is then vulcanized.

17. An article obtained by the method according to claim 15, in which it is a tire.

18. A plasma treated aramid monofilament characterized by the following relationships:
    $1.7 \leq Ti \leq 260$;
    $40 \leq D \leq 480$;
    $T \geq 170-D/3$;
    $Mi \geq 2000$;
    wherein Ti is the linear density in tex, D is the diameter in μm (micrometers), T is the tenacity in cN/tex, Mi is the initial modulus in cN/tex, and $W_{SL}$ is the reversible solid-liquid adhesion work expressed in mJ/m².

19. A monofilament according to claim 18, characterized in that it has an organic coating.

20. A monofilament according to claim 19, in which the coating comprises at least one resin selected from the group consisting of epoxy resins and phenol resins.

21. An assemblage comprising at least one monofilament according to claim 18.

22. An article reinforced with at least one monofilament according to claim 18.

23. A method of producing an article, in which at least one monofilament in accordance with claim 18 is placed in contact with a rubber composition.

* * * * *

UNITED STATES PATENT AND TRADEMARK OFFICE
CERTIFICATE OF CORRECTION

PATENT NO. : 5,411,638
DATED : May 2, 1995
INVENTOR(S) : Bernard et al.

It is certified that error appears in the above-indentified patent and that said Letters Patent is hereby corrected as shown below:

Title page, 2nd col., 7th line, "pp. Jul. 5" should read --pp. 1-5--; 4th line of ABSTRACT, "$WS_{SL}$" should read --$W_{SL}$--. Col. 6, delete lines 23-24. Col. 8, line 48, "SO2" should read --$SO_2$--. Col. 10, line 15, "in it" should read --in that it--; between lines 30-31, insert --$W_{SL} \geqq 120$--.

Signed and Sealed this

Twenty-second Day of August, 1995

Attest:

BRUCE LEHMAN

Attesting Officer    Commissioner of Patents and Trademarks